United States Patent
Van Breugel

[15] 3,677,083
[45] July 18, 1972

[54] ELECTRODE FOR MEASURING ALTERNATING VOLTAGES IN AN ELECTROLYTE

[72] Inventor: Johannes G. A. Van Breugel, Amstellaan 20, Heemstede, Netherlands

[22] Filed: May 22, 1970

[21] Appl. No.: 39,794

[52] U.S. Cl. ..........................73/194 EM, 324/29, 310/11, 204/195 R
[51] Int. Cl. ..........................G01f 1/00, G01p 5/08
[58] Field of Search..............73/194 EM; 204/280, 283, 284, 204/195 R; 417/50; 310/11

[56] References Cited

UNITED STATES PATENTS

| | | |
|---|---|---|
| 2,607,223 | 8/1952 | Fleming..........................73/194 EM |
| 1,910,709 | 5/1933 | Mortenson....................204/195 R X |
| 3,149,253 | 9/1964 | Luebke..........................310/11 |
| 3,272,731 | 9/1966 | Hutchison et al.............204/280 X |
| 3,275,860 | 9/1966 | Way................................310/11 |
| 3,354,644 | 11/1967 | Moore, Jr......................310/11 UX |
| 3,416,013 | 12/1968 | Poncelet et al................310/11 |
| 3,483,111 | 12/1969 | Zaromb..........................204/195 R |

*Primary Examiner*—Charles A. Ruehl
*Attorney*—Brumbaugh, Graves, Donohue & Raymond

[57] ABSTRACT

The invention relates to an electrode consisting of a conductor and adjacent to said conductor an electrolyt body, that contains copper ions. The electrolyt body is immobilized by a pervious structure, that may consist of a fine copper wire folded randomly in a recess containing the electrolyt body. Preferably the electrolyt body is bounded by a perforated plate.

6 Claims, 1 Drawing Figure

PATENTED JUL 18 1972
3,677,083
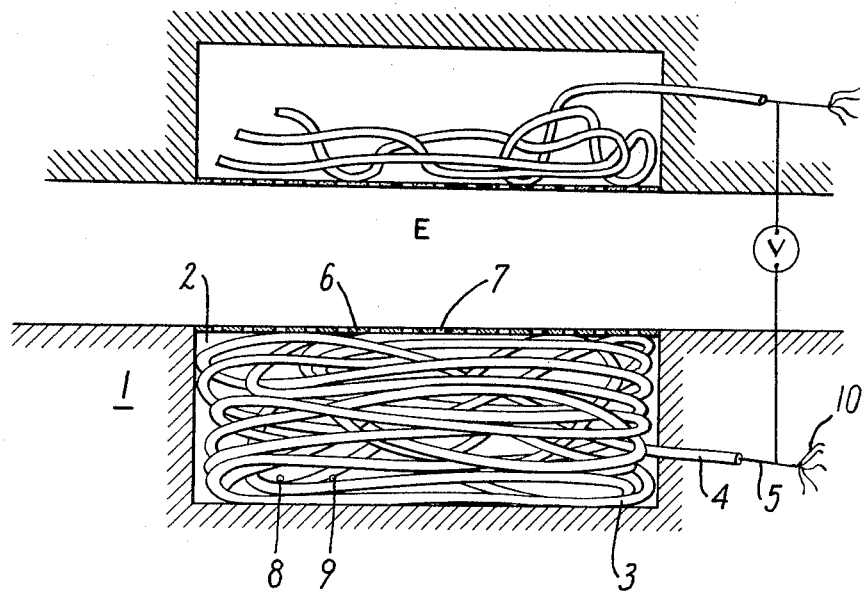
INVENTOR.
JOHANNES G. A. VAN BREUGEL
BY Brumbaugh Graves
Donohue & Raymond
his ATTORNEYS.

ELECTRODE FOR MEASURING ALTERNATING VOLTAGES IN AN ELECTROLYTE

When measuring voltages in a moving electrolyt, e.g. for measuring the flow velocity by means of measuring the voltage which is generated between electrodes in a magnetic field, considerable disturbances occur, which limit the exactness of the measurement.

So far electrodes of stainless steel have been suggested for measuring voltage in seawater. These indeed have the advantage of hardly any or extremely small corrosion, but on the other hand they have considerable disadvantages with respect to disturbances in the measurement, because juxta-positioned crystals have somewhat different compositions and because the interface potentials of the crystals are dependent on the crystal orientation. Moreover it has appeared that acorn-shells and the like can grow on the electrode, which can induce very important disturbances.

For measuring the flow velocity of an electrically conducting liquid in pipe lines silver electrodes have already been suggested.

The disturbances in the measurement mainly arise because of inhomogeneities of the electrode which lead to different interface potentials and, owing thereto, to different current densities, which gives in reciprocity with the flow of the electrolyt, which often contains turbulances, a considerable noise voltage. A further serious difficulty is that, when the electrode will show some form of scale, e.g. because acorn-shells start their formation, the complete electrode surface is very inhomogeneous and owing thereto the disturbing voltages become larger.

The invention aims at providing an electrode, which e.g. can be used in seawater, in the course of long periods of time, e.g. of the order of one year, is not subject to changes with respect to the disturbances, and which, moreover, gives the possibility of increasing the exactness of the measurement considerably, by almost completely eliminating the disturbances in the voltages indicated in the above.

Accordingly the invention provides a measuring electrode for measuring alternating voltages in a free electrolyt, like seawater, having a conductor adapted to electrically contact the electrolyt, said electrode being characterized in that between the conductor and the electrolyt a bounded electrolyt body is present, said body being in free contact with the conductor and comprising copper ions, and flow limiting means within said body for minimizing liquid exchange between the free electrolyt and the electrolyt body.

A feature which has proved to be favorable in practice herewith is, that the electrolyt body containing copper ions has been separated from the free electrolyt by means of a perforated wall. Owing to this on the one hand the flow in the free electrolyt passing along the wall is hardly disturbed and on the other hand a good limitation of the electrolyt body is obtained, with which the wall at the same time can serve as a mechanical lock in for the flow limiting means.

An embodiment of the invention, which has proved to be favorable in practice and which can be manufactured simply consists in that the conductor is a thin oblong copper containing wire, which has been arranged in a regular or irregular configuration in at least part of the electrolyt body and is surrounded by a manifold perforated insulation.

Another embodiment of the invention, with which also good results have been obtained consists in that a structure has been included in the electrolyt body which contains many fine free passages between the conductor and the free electrolyt.

When applying the invention the conductor preferably consists of copper. By this copper ions in the electrolyt body are obtained while electrolytically copper itself has a very constant interfacial potential.

According to a further improvement of the invention a substance which increases the viscosity of a liquid can be added to the electrolyt body, by which the liquid exchange between the electrolyt body and the free electrolyt is still further limited.

The invention will now further be elucidated with reference to the accompanying drawing, in which an embodiment of the invention in section has been shown.

In the drawn embodiment 2 is a recess in a solid body 1. In the recess a very thin copper wire 3, which has been provided with a perforated insulation 4, e.g. a thin cotton fabric or a perforated insulating envelope, has randomly been folded in the recess 2. The conductor 5 of the thread 3 forms the connection of the electrode. The recess 2 is terminated by means of a perforated plate 6 of an electrochemically inactive material. Because the wire has been folded to and fro many times in a regular or irregular configuration, the movement of the electrically conducting liquid in the recess 2 is hampered to a very considerable extent. First of all a very strong hampering of the movement takes place at the perforations in the insulation and secondly the randomly folded wire hampers movements of the liquid in the interspace between adjacent portions of the wire. Owing to this the liquid in the recess 2 forms a relatively immobilized electrolyt body.

When an electric field occurs in this electrolyt body, the voltage of which field has to be measured by means of a measuring apparatus, that is connected to the conductor 5 of the wire, the possibility exists that, e.g. by small inhomogeneities of the conductor 5 at the location of the thread present in the recess 2, the voltages in e.g. the points 8 and 9 do not level with each other. Then also different current densities will occur in the points 8 and 9. But since, the electrolyt mass in the vicinity of these points is substantially still the differences in current density do not cause noise voltages. Moreover, occurring noise voltages, if any, will get smaller and smaller near the plate 6 owing to mutual current exchange and they will amount to nearly zero at the perforations 7 in the plate 6.

Because the copper of the conductor 5 gradually dissolves in the electrolyt body inside the recess 2, a relatively high copper ion concentration will prevail in that recess, said concentration decreasing somewhat in the direction of the perforated plate 6. By this high copper ion concentration a milieu is maintained in which acorn-shells cannot grow. Growth of acorn-shells, if any, at the outside of the plate 6, it is true, is counteracted to a considerable less degree, but acorn-shells formed at that place do not influence the measuring result, as long as they do not lead to the perforations becoming overgrown. On the other hand the growth of acorn-shells on a metal surface, which is used as an electrode, the formation of local extremely thin layers already gives raise to considerable disturbances of the voltage.

With this arrangement one has succeeded in performing measurements with which the noise was of the order of magnitude of the Nyquist-noise, which belongs to the space resistance of the electrode. By this the sensitivity of electrodynamic flow velocity meters could be increased to a very considerable degree.

It is pointed out that in the drawn embodiments a structure is formed by the wire 3 which has been folded to and fro which contains may fine free passages between the conductor and the free electrolyt. It falls also within the scope of the invention to realize such a structure in other ways.

A substance increasing the viscosity, said substance being known in itself, can have been added to the electrolyt in the recess 2. This to a further degree hampers the movement of the liquid in this recess.

The perforated plate retains the wire 3 within the recess 2, and also provides a uniform restriction on circulation of the electrolyte into and out of the recess 2, which the perforations 7 assure to electrical contact with the free electrolyt E.

It is pointed to the fact that the flow limiting means, like the wire and its insulation, do not have a depolarizing function, because alternating voltages are measured. This can take place in a known way with flow velocity measurements by exciting the voltages to be measured with an alternating magnetic field.

Because the very long conductor 5 of the wire 3 has a large surface in the recess 2, the interface resistance between this conductor and the electrolyt body present in the recess 2 is also small which keeps the noise potential caused by said interface resistance low.

For increasing the double-layer capacity, which is in series with the interface resistance of the conductor in the electrolyt body, the wire preferably is carried out in a number of thin parallel sub-wires 10 (Litze).

What I claim is:

1. A system for measuring an electric field in a free electrolyte comprising:

two conductors, at least one of said conductors including an elongated wire;

means enclosing said elongated wire within a bounded portion of said electrolyte and holding said bounded portion of said electrolyte in intimate contact with said elongated wire, said elongated wire being folded in multiple strands to and fro within said enclosing means, leaving only small intersticies between adjacent portions of said wire which severely impede circulation of said bounded portion of said electrolyte; and means for measuring the voltage drop between said two conductors.

2. The system defined in claim 1, wherein said bounded portion of said electrolyte is separated from the free electrolyte by a pervious wall.

3. The system defined in claim 1, wherein said elongated wire comprises a plurality of thin copper subwires.

4. A system for measuring an electric field in a free electrolyte, comprising:

two conductors, one of which includes an elongated wire;

means enclosing said elongated wire within a bounded portion of said electrolyte and holding said bounded portion of said electrolyte in intimate contact with said elongated wire;

means for a substantially immobilizing circulation of said electrolyte in close proximity to said elongated wire, including multiple strands of said wire folded to and fro in said enclosing means; and means for measuring the voltage drop between said two conductors.

5. The system defined in claim 4, wherein said circulation immobilizing means further comprises a viscosity increasing substance added to said bounded portion of said electrolyte.

6. The system defined in claim 4, wherein said bounded portion of said electrolyte is separated from the free electrolyte by a pervious wall; and said elongated wire comprises a plurality of thin copper subwires.

* * * * *